United States Patent
Lee

(10) Patent No.: US 11,467,642 B2
(45) Date of Patent: Oct. 11, 2022

(54) ELECTRONIC APPARATUS AND CONTROLLING METHOD THEREOF

(71) Applicant: Samsung Electronics Co., Ltd., Suwon-si (KR)

(72) Inventor: Junhyuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 16/707,487

(22) Filed: Dec. 9, 2019

(65) Prior Publication Data

US 2020/0183470 A1 Jun. 11, 2020

(30) Foreign Application Priority Data

Dec. 11, 2018 (KR) .................. 10-2018-0158927

(51) Int. Cl.
   - G06F 1/26 (2006.01)
   - G06F 9/445 (2018.01)
   - H04L 43/08 (2022.01)

(52) U.S. Cl.
   CPC .............. G06F 1/26 (2013.01); G06F 9/445 (2013.01); H04L 43/08 (2013.01)

(58) Field of Classification Search
   CPC ............ G06F 1/26; G06F 9/445; H04L 43/08
   See application file for complete search history.

(56) References Cited

U.S. PATENT DOCUMENTS

| | | | |
|---|---|---|---|
| 9,280,391 B2 | 3/2016 | Ben-Itzhak | |
| 9,285,858 B2 * | 3/2016 | Klassen | G06F 1/324 |
| 9,652,021 B2 | 5/2017 | Kim | |
| 10,375,207 B2 | 8/2019 | Chae et al. | |
| 10,439,868 B2 | 10/2019 | Lim et al. | |
| 2013/0042250 A1 | 2/2013 | Lim et al. | |
| 2015/0058646 A1 | 2/2015 | Kim | |
| 2015/0309552 A1 | 10/2015 | Vanka et al. | |
| 2016/0254950 A1 | 9/2016 | Lim et al. | |
| 2018/0157315 A1 * | 6/2018 | Ehsan | G06F 1/3206 |
| 2018/0181188 A1 | 6/2018 | Park | |

(Continued)

FOREIGN PATENT DOCUMENTS

| | | |
|---|---|---|
| KR | 10-2013-0094577 | 8/2013 |
| KR | 10-2015-0022593 | 3/2015 |

(Continued)

OTHER PUBLICATIONS

Korean Office Action dated Jan. 8, 2020 in Korean Patent Application No. 10-2018-0158927.

(Continued)

*Primary Examiner* — Zahid Choudhury

(57) ABSTRACT

An electronic apparatus and controlling method thereof is provided. The electronic apparatus includes a processor configured to, based on receipt of a command to execute an application, execute the application based on the boosting level information, based on a difference between a loading time according to the application being executed and a reference loading time being equal to or greater than a threshold value, identify another boosting level information of the electronic apparatus based on the reference loading time, and update the stored boosting level information to the identified other boosting level information.

16 Claims, 9 Drawing Sheets

(56) References Cited

U.S. PATENT DOCUMENTS

2018/0293087 A1  10/2018  Lee et al.
2019/0034222 A1   1/2019  Choi

FOREIGN PATENT DOCUMENTS

| KR | 10-1649403 | 8/2016 |
| KR | 10-2016-0104951 | 9/2016 |
| KR | 10-2017-0039999 | 4/2017 |
| KR | 10-2017-0090278 | 8/2017 |
| KR | 10-2017-0098106 | 8/2017 |
| KR | 10-2018-0076631 | 7/2018 |

OTHER PUBLICATIONS

Korean Notice of Allowance dated Jun. 9, 2020 in Korean Patent Application No. 10-2018-0158927.

* cited by examiner

| APPLICATIONS | BOOSTING LEVEL INFORMATION | REFERENCE LOADING TIME |
|---|---|---|
| Message Application A | Lv. 3 (1.2 GHz) | 1 Sec |
| Game Application A | Lv. 5 (1.9 GHz) | 1.2 Sec |
| Game Application B | Lv. 2 (1.0 GHz) | 1.2 Sec |
| Camera Application A | Lv. 1 (0.7 GHz) | 0.8 Sec |

| APPLICATIONS | BOOSTING LEVEL INFORMATION | REFERENCE LOADING TIME |
|---|---|---|
| Message Application A | Lv. 1 (0.7 GHz) | 2 Sec |
| | Lv. 2 (1.0 GHz) | 1.5 Sec |
| | Lv. 3 (1.2 GHz) | 1.0 Sec |
| | Lv. 4 (1.5 GHz) | 0.8 Sec |
| | Lv. 5 (1.9 GHz) | 0.7 Sec |
| Game Application A | Lv. 1 (0.7 GHz) | 2.5 Sec |
| | Lv. 2 (1.0 GHz) | 2.0 Sec |
| | Lv. 3 (1.2 GHz) | 1.7 Sec |
| | Lv. 4 (1.5 GHz) | 1.5 Sec |
| | Lv. 5 (1.9 GHz) | 1.3 Sec |

FIG. 7

| APPLICATIONS | BOOSTING LEVEL INFORMATION | REFERENCE LOADING TIME | EXECUTION FREQUENCY | TYPE |
|---|---|---|---|---|
| Message Application A | Lv. 3 (1.2 GHz) | 1 Sec | 15 | SNS |
| Game Application A | Lv. 5 (1.9 GHz) | 1.2 Sec | 30 | Game |
| Game Application B | Lv. 2 (1.0 GHz) | 1.2 Sec | 5 | Game |
| Camera Application A | Lv. 1 (0.7 GHz) | 1 Sec | 1 | Life Style |

ELECTRONIC APPARATUS AND CONTROLLING METHOD THEREOF

CROSS-REFERENCE TO RELATED APPLICATIONS

This application claims priority from Korean Patent Application No. 10-2018-0158927, filed on Dec. 11, 2018 in the Korean Intellectual Property Office, the disclosure of which is incorporated herein by reference in its entirety.

BACKGROUND

1. Field

Apparatuses and methods consistent with exemplary embodiment of the present disclosure relate to an electronic apparatus and a controlling method thereof and more particularly, to an electronic apparatus having a boosting mode and a controlling method thereof.

2. Description of the Related Art

With the development an electronic technology, various types of electronic apparatuses have been developed and distributed.

In particular, various types of mobile devices including a smart phone are being distributed, and such mobile devices have been used in various ways such as for work, game, image viewing, etc.

Such mobiles devices need to operate efficiently within limited resources such as a battery, and their performance needs to be managed appropriately.

Accordingly, a function of boosting the performance of a mobile device to a maximum level, when necessary, or boosting the performance of a device if there is a load of a certain level or more has been actively studied.

The function of boosting the performance of a device in the conventional art has a limitation that it operates only when a specific application is driven based on a list, etc., and it does not take into consideration the remaining battery amount, etc.

There is a need to efficiently utilize the limited resources by operating the boosting function more preciously without boosting the performance in unnecessary situations.

SUMMARY

The present disclosure provides an electronic apparatus that identifies a boosting level in consideration of a loading time of an application and a controlling method thereof.

An aspect of the embodiments relates to an electronic apparatus including a memory configured to store boosting level information of the electronic apparatus for applications executable on the electronic apparatus and a processor configured to, based on receipt of a command to execute an application among the applications, execute the application based on the boosting level information, and based on a difference between a loading time of the application being executed and a reference loading time being equal to or greater than a threshold value, identify another boosting level information of the electronic apparatus based on the reference loading time and update the stored boosting level information to the identified other boosting level information.

The memory may include information regarding a loading time of an application for each boosting level information, and the processor may identify the boosting level information corresponding to the reference loading time based on information stored in the memory.

The processor may identify the boosting level to reduce a loading time of the application by a difference value between a loading time according to execution of the application and the reference loading time.

The boosting level information of the electronic apparatus for each application stored in the memory may be determined based on an execution history of the each application.

The processor, based on a re-execution command to re-execute the application being input, may control an operation frequency of the processor based on one of the boosting level information and the updated boosting level information on the basis of state information of the electronic apparatus.

The state information of the electronic apparatus may include at least one of information regarding a remaining battery of the electronic apparatus, usage information of the processor, usage information of the memory, or heat-emitting information.

The processor may determine a control mode of the processor based on state information of the electronic apparatus, and based on determining that a control mode of the processor is a boosting mode, execute the application based on boosting level information stored in the memory.

The processor may determine a control mode of the processor based on type information of the application and execution frequency information of the application, and based on determining that a control mode of the processor is a boosting mode, execute the application based on boosting level information stored in the memory.

The boosting level information of the electronic apparatus may be divided based on operation frequency information of the processor.

The reference loading time may include at least one of a recommended loading time of the application, a loading time when the application is initially executed, an average loading time of the application or a loading time when the application is executed in a state where the electronic apparatus is in an idle state.

An aspect of the embodiments relates to a controlling method of an electronic apparatus including, storing boosting level information of the electronic apparatus for applications executable on the electronic apparatus, based on receipt of a command to execute an application among the applications, executing the application based on the boosting level information, based on a difference between a loading time of the application being executed and a reference loading time being equal to or greater than a threshold value, identifying another boosting level information of the electronic apparatus based on the reference loading time, and updating the stored boosting level information to the other identified boosting level information.

The identifying boosting level information may include identifying the boosting level information corresponding to the reference loading time based on information regarding a loading time of an application for each boosting level information.

The identifying boosting level information may include identifying the boosting level to reduce a loading time of the application by a difference value between a loading time according to execution of the application and the reference loading time.

The boosting level information of the electronic apparatus for each application may be determined based on an execution history of the each application.

The method may include, based on a re-execution command to re-execute the application being input, controlling an operation frequency of the processor based on one of the boosting level information and the updated boosting level information on the basis of state information of the electronic apparatus.

The state information of the electronic apparatus may include at least one of information regarding a remaining battery of the electronic apparatus, usage information of the processor, usage information of the memory, or heat-emitting information.

The method may include determining a control mode of the processor based on state information of the electronic apparatus, and based on determining that a control mode of the processor is a boosting mode, executing the application based on the boosting level information.

The method may include determining a control mode of the processor based on type information of the application and execution frequency information of the application, based on determining that a control mode of the processor is a boosting mode, executing the application based on the boosting level information.

The boosting level information of the electronic apparatus may be divided based on operation frequency information of the processor.

The reference loading time may include at least one of a recommended loading time of the application, a loading time when the application is initially executed, an average loading time of the application or a loading time when the application is executed in a state where the electronic apparatus is in an idle state.

According to the above-described various embodiments, the boosting level of an electronic apparatus may be adjusted appropriately so that the loading time of an application is maintained consistently and a user does not experience the deterioration of the performance of the apparatus.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 7 is a view provided to explain an execution history according to an embodiment;

DETAILED DESCRIPTION OF EXEMPLARY EMBODIMENTS

Figure 1:
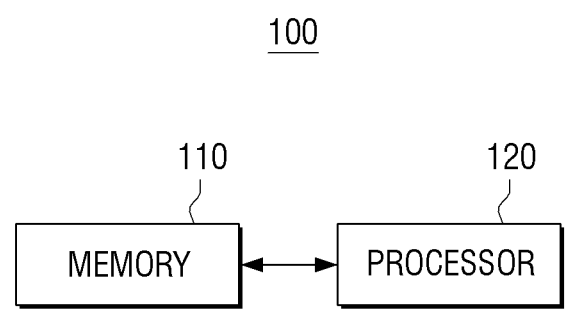
FIG. 1 is a block diagram illustrating configuration of an electronic apparatus according to an embodiment.

Hereinafter, the present disclosure will be described in detail with reference to the accompanying drawings.

The terms used in the present disclosure are selected as general terminologies currently widely used in consideration of the configuration and functions of the present disclosure, but can be different depending on the intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure The terms "have", "may have", "include", and "may include" used in the exemplary embodiments of the present disclosure indicate the presence of corresponding features (for example, elements such as numerical values, functions, operations, or parts), and do not preclude the presence of additional features.

The term "at least one of A or/and B" means (1) including at least one A, (2) including at least one B, or (3) including both at least one A and at least one B.

The term such as "first" and "second" used in various exemplary embodiments may modify various elements regardless of an order and/or importance of the corresponding elements, and does not limit the corresponding elements.

If it is described that a certain element (e.g., first element) is "operatively or communicatively coupled with/to" or is "connected to" another element (e.g., second element), it should be understood that the certain element may be connected to the other element directly or through still another element (e.g., third element).

Singular forms are intended to include plural forms unless the context clearly indicates otherwise. The terms "comprise" or "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In addition, the terms "module" or "unit" used in exemplary embodiments indicates an element performing one or more functions or operations, and may be implemented by using hardware or software or a combination of hardware and software. In addition, a plurality of "modules" or a plurality of "units" may be integrated into one or more modules, except that a "module" or "unit" needs to be implemented by specific hardware, and may be implemented as at least one processor (not shown).

Also, the term "user" may refer to a person who uses an electronic apparatus or an apparatus (e.g., an artificial intelligence (AI) electronic apparatus) that uses the electronic apparatus.

Hereinafter, exemplary embodiments will be described in greater detail with reference to the accompanying drawings.

FIG. 1 is a block diagram illustrating configuration of an electronic apparatus according to an embodiment.

An electronic apparatus 100 according to various exemplary embodiments may include at least one of, for example, smartphone, tablet PC, mobile phone, video phone, e-book reader, desktop PC, laptop PC, netbook computer, workstation, server, PDA, portable multimedia player (PMP), MP3 player, medical device, camera, or a wearable device. The wearable device may include at least one of an accessory type device (for example, a watch, a ring, a bracelet, an ankle bracelet, a necklace, glasses, a contact lens, or a head-mounted device (HMD)), a fabric- or clothing-mounted device (for example, electronic apparels), a bodymounted device (for example, a skin pad, tattoos, etc.), or a bio-implantable device (for example, an implantable circuit). In other embodiments, the electronic apparatus may include at least one of, for example, TVs, digital video disc (DVD) players, audios, refrigerators, air conditioners, cleaners, ovens, microwave ovens, washing machines, air cleaners, set-top boxes, home automation control panels, security control panels, media boxes (for example, Samsung HomeSync™, Apple TV™, or Google TV™), game consoles (for example, Xbox™ and PlayStation™), electronic dictionaries, electronic keys, camcorders, or electronic picture frames.

In other embodiments, the electronic apparatus may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, an automatic teller's machine of a financial institute, a point of sales (POS) of a shop, and Internet of things (IoT) devices (for example, a light bulb, various sensors, an electric or gas meter, a sprinkler system, a fire alarm, a thermostat, a street light, a toaster, an exercise equipment, a hot water tank, a heater, a boiler, and the like).

Referring to FIG. 1, the electronic apparatus 100 includes a memory 110 and a processor 120.

The memory 110 stores various data such as an Operation System (O/S) software module to operate the electronic apparatus 100 and various multimedia contents. In particular, the memory 110 may store the boosting level information of the electronic apparatus 100 for each application. The boosting level information will be described in detail later.

The processor 120 controls the overall operations of the electronic apparatus 100.

The processor 120 according to an embodiment may be implemented as a digital signal processor (DSP), a microprocessor, and a time controller (TCON), but is not limited thereto. The processor 120 may include one or more among a central processing unit (CPU), a micro controller unit (MCU), a micro processing unit (MPU), a controller, an application processor (AP), a graphics-processing unit (GPU), a communication processor (CP), or an ARM processor, or may be defined as a corresponding term. The processor 120 may be implemented as a system on chip (SoC) or a large scale integration (LSI) which a processing algorithm is built therein or in the form of a field programmable gate array (FPGA). The processor 120 may perform various functions by executing a computer executable instructions stored in the memory 110. Meanwhile, as described above, the CPU 110 may be an element of the processor 120, or may be hardware separate from the processor 120.

In particular, the processor 120 access the memory 110, and performs booting using the O/S stored in the memory 110. In addition, the processor 120 performs various operations using various programs and content data stored in the memory 110.

The processor 120 may operate at an operating frequency within a certain range and execute an application. Here, the operation frequency may be referred to as a clock frequency, a clock speed, etc., but hereinafter, will be referred to as an operating frequency for convenience of explanation.

The processor 120 according to an embodiment may operate at a fundamental frequency or at a frequency that is modified within a specific range including the fundamental frequency. For instance, the processor 120 may operate at the fundamental frequency when the electronic apparatus 100 is in an idle state, and may operate at a frequency higher than the fundamental frequency when there is an event. Here, the frequency higher than the fundamental frequency may be referred to as a turbo frequency, a boost frequency, an overclock, etc. In addition, the operation frequency corresponding to the upper limit within a specific range may be referred to as a maximum turbo frequency, a maximum boost frequency, etc.

In the processor 120 according to an embodiment, the energy/power consumption is proportional to the performance improvement and thus, in order to improve the performance, the energy/power consumption may inevitably increase. For instance, the power consumption of the processor 120 is proportional to the dynamic frequency of the processor 120. In order to balance the performance of the electronic apparatus 100 with the power consumption, the processor 120 needs to operate fluidly between the fundamental frequency and the turbo frequency (or the maximum turbo frequency). The processor 120 according to the various embodiments may operate at an operating frequency that is adaptively adjusted within a specific range under the control of the processor 120 on its own. Here, the range of the operable frequency of the processor 120 may vary according to the design, purpose of the manufacturer or the user setting, and is not limited to a specific number.

Meanwhile, the electronic apparatus 100 according to an embodiment may include hardware that is separate from the processor 120. For instance, the electronic apparatus 100 may include a CPU, and the processor 120 may control the operating frequency of the CPU. The CPU may drive and execute an application at a modified operating frequency under the control of the processor 120.

Meanwhile, the processor 120 according to the various embodiments may control its own operating frequency, and may control the operating frequency of separate hardware such as Graphic Processing Unit (GPU), Application Unit (AP), Communication Unit (CP), etc.

Meanwhile, hereinafter, the boosting level information stored in the memory 110 will be described with reference to FIG. 3.

Figure 3:
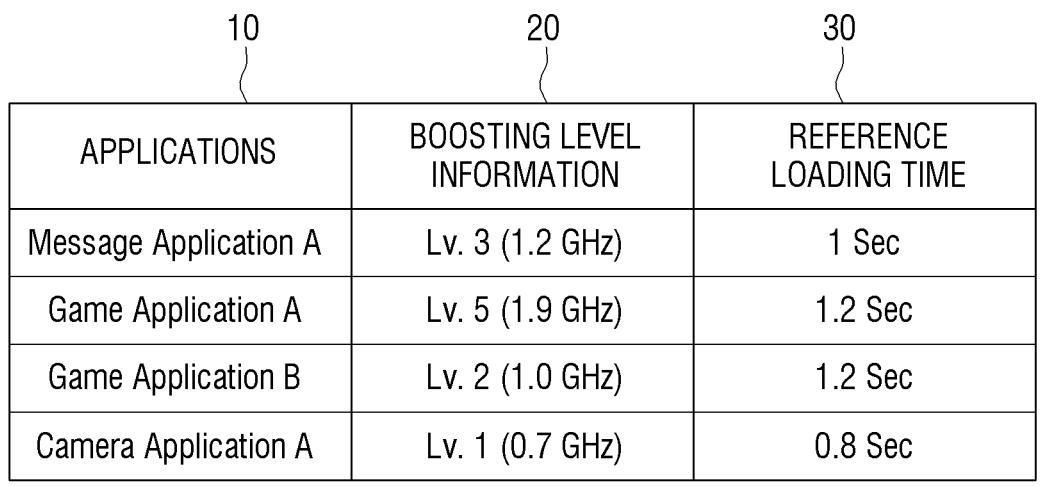
FIG. 3 is a view provided to explain boosting level information according to an embodiment.

FIG. 3 is a view provided to explain boosting level information according to an embodiment.

The electronic apparatus 100 according to an embodiment may include a boosting mode to enhance the operation efficiency of the electronic apparatus 100 within limited resources. Here, the boosting mode may be a mode for changing the operating frequency of the processor according to the operation environment of the electronic apparatus 100, state information, applications 10 or so. Meanwhile, in an embodiment, the processor 120 may be a mode for changing the operating frequency, supply power, etc. of various types of hardware (e.g., a GPU, a memory, etc.) provided in the electronic apparatus 100, in addition to the operating frequency of the processor 120.

For instance, the boosting mode may be a mode for changing the operating frequency (or operation speed, operation clock, etc.) of the memory 110 provided in the electronic apparatus 100 or a mode for changing the operating frequency (or operating speed, operation clock, etc.) of a GPU (or image processor) provided in the electronic apparatus 100. Hereinafter, it is assumed that the boosting level information 20 is divided based on the operating frequency information of the processor 120 for convenience of explanation.

The memory 110 according to an embodiment may store the boosting level information 20 of the electronic apparatus 100 for each of the applications 10. Here, the boosting level information 20 may refer to the level information which is divided by the operating frequency of the processor 120. For instance, if the processor 120 may operate within the first to the second operating frequency ranges, the first level information according to the boosting level information 20 may refer to the first operating frequency and the second level information may refer to the second operating frequency. As described below, the processor 120 itself may control the operating frequency of the processor 120 to correspond to the boosting level information. Meanwhile, this is only an embodiment, what is adjusted by the boosting level information 20 is not limited to the operating frequency of the processor 120. For instance, in addition to the operating frequency of the processor 120, the operating frequency of the memory 110, the timing of the memory 110, the operating frequency of a GPU (or image processor) may be changed according to the booting level information 20. The timing of the memory 110 according to an embodiment may be defined as tCL(CAS Latency)-tRCD(RAS to CAS Delay)-tRP(Row Precharge Time)-tRAS(Row Active Time), etc. Meanwhile, as the boosting level is increased according to the boosting level information 20, the timing of the memory 110 may be decreased, and as the boosting level is decreased, the timing of the memory 110 may be increased, but is not limited thereto. For instance, the timing of the memory 110 may be changed only by the manufacturer's setting, the user's manual setting, etc. regardless of the boosting level.

Referring to FIG. 3, the boosting level information 20 corresponding to 'Message Application A' may be 'Level. 3', and the operating frequency of the processor 120 corresponding to 'Level 3' may be 1.2 GHz. Meanwhile, the table of FIG. 3 is merely an example illustrating that the boosting level information 20 of the electronic apparatus 100 corresponding to the applications 10 is stored in the memory 110, and the present disclosure is not limited to a certain form of table or list.

If a user command to execute the applications 10 is input, the processor 120 according to an embodiment may execute the applications 10 based on the boosting level information 20. Subsequently, if the difference between the loading time according to the execution of the application and the reference loading time corresponding to the applications 10 is equal to or greater than a threshold value, the processor 120 according to an embodiment may identify the boosting level information 20 of the electronic apparatus 100 based on the reference loading time, which will be described in detail with reference to FIG. 3.

Referring to FIG. 3, the boosting level information 20 corresponding to Game Application B' may be 'Level. 2', and the operating frequency of the processor 120 corresponding to 'Level. 2' may be 1.0 GHz. According to an embodiment, if a command to execute 'Game Application B' is input, the processor 120 may execute 'Game Application B' through the processor 120 where the operating frequency is changed to 1.0 GHz. Subsequently, the processor 120 may identify the loading time according to the execution of 'Game Application B.' Here, the loading time may mean the time required to load (or call) the data stored in the auxiliary storage device to the main storage device. The loading time may be different for each of the applications 10. Even with the same applications 10, the loading time may differ according to the execution environment, the state of the electronic apparatus 100, the boosting level of the processor 120, the usable space of the memory 110 (or the main memory), etc.

According to an embodiment, when the loading time according to the execution of the applications 10 is identified, the processor 120 may determine whether the difference between the identified loading time and the reference loading time 30 corresponding to the applications 10 is equal to or greater than a threshold value.

For instance, the processor 120 may determine whether the difference between the identified loading time and the reference loading time is equal to or greater than 0.5 sec, whether the identified loading time is equal to or greater than 0.5 sec over the reference loading time, etc. Here, 0.5 sec is only an example, and the threshold value is not limited thereto. For instance, the threshold value may be 2 sec, 3 sec, etc. varying according to the setting of the user or the manufacturer, the applications 10 etc.

According to another embodiment, the processor 120 may determine whether the identified loading time exceeds a particular time. For instance, if the loading time exceeds 3 sec, a plurality of users may forcibly terminate the execution of the applications 10 and re-execute the applications 10. The processor 120 may identify whether the loading time exceeds 3 sec. Here, 3 sec is only an example, and the threshold value is not limited thereto.

Figure 4:
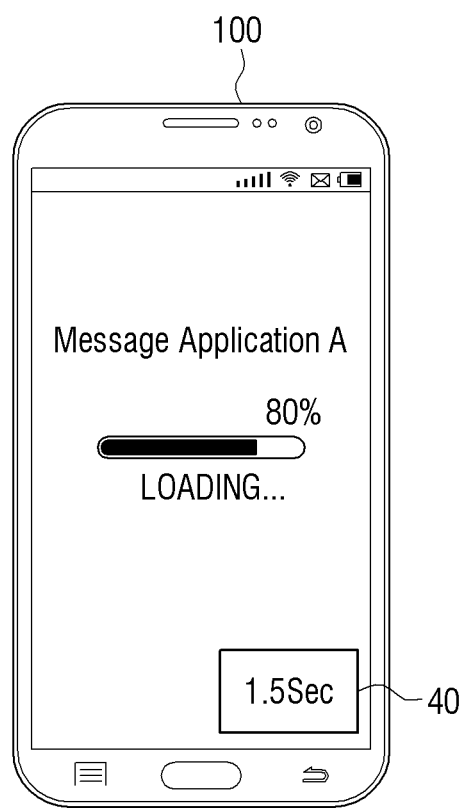
FIG. 4 is a view provided to explain a loading time according to an embodiment.

FIG. 4 is a view provided to explain a loading time according to an embodiment.

For instance, the processor 120 may determine whether the difference between the loading time 40 according to the execution of 'Game Application B' and the reference loading time 30 corresponding to 'Game Application B' exceeds 1.2 sec. Subsequently, if the difference between the loading time 40 according to the execution of the applications 10 and the reference loading time 30 corresponding to the applications 10 is equal to or greater than a threshold value, the processor 120 may identify the boosting level information of the electronic apparatus 100 based on the reference loading time 30.

Referring to FIG. 4, the loading time 40 according to the execution of 'Game Application B' is 1.5 sec, and the reference loading time 30 corresponding to 'Game Application B' is 1.2 sec and thus, it may be assumed that the difference between the loading time 40 according to the execution and the reference loading time 30 is 0.3 sec. According to an embodiment, if the threshold value is 1.2 sec, the processor 120 may identify the boosting level information 20 of the electronic apparatus 100 based on the reference loading time 30 of 1.2 sec.

According to an embodiment, the processor 120 may identify the boosting level information 20 such that the difference between the loading time 40 according to the execution of the applications 10 and the reference loading time 30 is less than a threshold value.

According to another embodiment, the processor 130 may identify the boosting level information 20 such that the loading time 40 according to the execution of the applications 10 is less than a certain time. Here, the certain time may be defined according to the setting of the manufacturer of the user based on the time when the user's bounce rate is high. For instance, if the loading time of the applications 10 exceeds 3 sec, a user may forcibly terminate the applications 10 and re-execute the applications 10. Based on such experimental data, the electronic apparatus 100 may identify the boosting level information 20 such that the applications 10 are executed within a specific time.

According to another embodiment, the processor 140 may identify the boosting level information of the electronic apparatus 100 such that the applications 10 are loaded within the reference loading time 30. Here, the reference loading time 30 may refer to at least one of the recommended loading time of the applications 10, the loading time of the initial execution of the applications 10, the average loading time of the applications 10, or the loading time when the application is executed in a state where the electronic apparatus 100 is in an idle state. Here, the recommended loading time may be the loading time set by a manufacturer, a distributor, etc. For instance, the distributor of 'Game Application A' may set information regarding the recommended loading time so that the corresponding applications 10 are loaded within 3 sec. In this case, the processor 120 may identify the boosting level information 20 of the electronic apparatus 100 so that 'Game Application A' is loaded within 3 sec based on the information regarding the recommended loading time.

The loading time when the applications 10 are initially executed according to an embodiment may mean the loading time which is identified according to the initial execution after the applications 10 are installed in the electronic apparatus 100. As the electronic apparatus 100 is used for a prolonged time, the speed of the electronic apparatus 100 may be reduced. For instance, as the cumulative use time of the electronic apparatus 100 increases, the loading time 40 according to the execution of the applications 10 may increase due to various reasons such as a decrease in the size of usable space of the memory 110, a decrease of the life time of a battery, version update of the applications 10, etc.

The processor 120 according to an embodiment may identify the loading time when the applications 10 are initially executed as the reference loading time 30, and may continuously identify the boosting level information 20 so that the difference between the loading time 40 according to the execution of the applications 10 and the reference loading time 30 is within a threshold value.

The loading time when the applications 10 according to an embodiment are executed while the electronic apparatus 100 is in an idle state may mean a case where the applications 10 are executed in a state where a sufficient storage space is secured in the main storage device of the electronic apparatus 100. For instance, if a plurality of applications 10 are being loaded onto the main storage device of the electronic apparatus 100 in a multi-tasking environment, the loading time according to the execution of the new applications 10 may increase in comparison with the loading time when the applications 10 are executed in an idle state. The processor 120 according to an embodiment may set the loading time when the applications 10 are executed in an idle state as the reference loading time 30.

The processor 120 according to an embodiment may identify the boosting level information 20 of the electronic apparatus 100 based on the reference loading time 20, and update the boosting level information 20 stored in the memory 110 to the identified boosting level information 20', which will be described in detail with reference to FIGS. 5 and 6.

Figure 5:
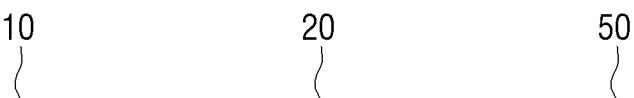
FIG. 5 is a view provided to explain a loading time for boosting level information according to an embodiment.

FIG. 5 is a view provided to explain a loading time for boosting level information according to an embodiment.

Referring to FIG. 5, the electronic apparatus 100 may include loading time information 50 of the applications 10 for each boosting level information 20. The electronic apparatus 100 according to an embodiment may include loading time information 50 for each boosting level information 20 with respect to at least one application 10 from among a plurality of applications which are installed on the electronic apparatus 100.

For instance, the processor 120 may load the applications 10 at different times according to the boosting level information 20. For instance, if the operating frequency of the processor 120 is a relatively high boosting level (e.g., Level. 5) in comparison with the fundamental frequency, the processor 120 may load Message Application A' within 0.7 sec. In another embodiment, if the operating frequency of the processor 120 is the fundamental frequency (e.g., Level. 1), the processor 120 may load Message Application A' within 2 sec.

The processor 120 according to an embodiment may include the loading time information 50 of the applications 10 for each boosting level information 20 according to the current state of the electronic apparatus 100. For instance, as the performance of the electronic apparatus 100 is deteriorated, the loading time 40 of the applications may increase in proportion to the cumulative use time. The electronic apparatus 100 may store the loading time information 50 corresponding to the current cumulative use time.

As illustrated in FIG. 5, the electronic apparatus 100 according to an embodiment may store the loading time information 50 of the applications 10 for each boosting level information 20 according to the current state (or cumulative use time). The loading time information 50 may be received from an external server, or may be generated based on the information obtained by the electronic apparatus 100 itself as the electronic apparatus 100 drives the applications 10.

The processor 140 according to an embodiment may generate the loading time information 50 based on the execution history of each application 10 and store the loading time information 50 in the memory 110 as illustrated in FIG. 5. For instance, the processor 120 may generate or update the loading time information 50 for each boosting level information 10 based on the use history of Message Application A.' Meanwhile, this is only an example, and the electronic apparatus 100 may receive the loading time information 50 from an external server and store the same as described above.

The processor 120 according to an embodiment may identify the boosting level information 20 corresponding to the reference loading time 30 based on the loading time information 50.

For instance, the processor 140 may identify the loading time 40 of 2.5 sec according to the execution of 'Game Application A', and may assume a case where the reference loading time 30 of 'Game Application A' is 1.3 sec. The difference between the loading time 40 according to the execution and the reference loading time 30 is equal to or greater than 1.2 sec, the processor 120 may identify the boosting level information 20 of the electronic apparatus 100 to reduce the loading time 40 according to the execution of 'Game Application A' by the difference value (e.g., 2.5−1.3=1.2 sec). Referring to FIG. 5, if the boosting level information 20 of the electronic apparatus 10 is Level. 5, the loading time 40 according to the execution of 'Game Application A' can be shortened by 1.2 sec.

Referring back to FIG. 1, the processor 120 may update the boosting level information 20 stored in the memory 110 to the identified boosting level information 20'. Subsequently, if a user command to re-execute the applications 10 is input, the processor 120 according to an embodiment may execute the applications 10 by controlling the boosting level (or operating frequency) of the electronic apparatus 100 based on the updated boosting level information 20', which will be described in detail with reference to FIG. 6.

Figure 6:
FIG. 6 is a view provided to explain updated boosting level information according to an embodiment.

FIG. 6 is a view provided to explain updated boosting level information according to an embodiment.

Referring to FIGS. 3 and 6, the boosting level information 20 of the electronic apparatus 100 for each application 10 may be updated. For instance, in the related art, in order to maintain the loading time 40 according to the execution of Message Application A' within the reference loading time 30, the boosting level information 20 of the electronic apparatus 100 corresponds to Level. 3, but there may be a case where the loading time when the Message Application A' is executed at Level. 3, the loading time may exceed the reference loading time 30 due to the performance deterioration of the electronic apparatus 100. In this case, the processor 120 may identify new boosting level information 20'. Subsequently, when the applications 10 are re-executed, the applications may be executed by controlling the boosting level (or the operating frequency) of the processor 120 based on the new boosting level information 20'. Here, the new boosting level information 20' may be the new boosting level information 20' that is identified based on the loading time information 50 for each boosting level information 20 illustrated in FIG. 5.

Referring to FIG. 6, Message Application A' may be executed through the processor 120 whose operating frequency is changed to the operating frequency corresponding to Level. 4, not Level. 3, according to the updated boosting level information 20', the loading time 40 according to the execution may be maintained within 1 sec of the reference loading time 30.

Referring back to FIG. 1, the processor 120 according to an embodiment may determine a control mode of the processor 120 based on type information 70 of the applications 10 and execution frequency information 60 of the applications 10, and if it is determined that a control mode of the processor 120 is a boosting mode, may execute the applications 10 based on the boosting level information 20 stored in the memory 110, which will be described in detail with reference to FIG. 7.

FIG. 7 is a view provided to explain an execution history according to an embodiment.

Referring to FIG. 7, the processor 120 according to an embodiment may determine a control mode of the processor 120 based on the type information 70 of the applications 10 and the execution frequency information 60 of the applications 10. Here, the control mode may include a general mode and a boosting mode. The general mode may mean a mode in which the operating frequency of the processor 120 is set to the fundamental frequency. However, this is only an example, and if the boosting level of the processor 120 is Level. 1 according to the boosting level information 20, it may mean a general mode. Meanwhile, not only the operating frequency of the processor 120 but also the operating frequency (or operation clock, etc.) of various components provided in the electronic apparatus 100 may be changed according to whether the control mode is the general mode or the boosting mode. For instance, in the general mode of the electronic apparatus 100, at least one of the processor 120, the memory 120 or a GPU may operate at the fundamental frequency, and in the boosting mode of the electronic apparatus 100, at least one of the processor 120, the memory 110 or a GPU may operate at an operation frequency which is improved over the fundamental frequency.

The processor 120 according to an embodiment may determine a control mode of the processor 120 to the boosting mode if the category of the applications 10 corresponds to a specific category or the execution frequency of the applications 10 exceeds a predetermined number of times. Here, the specific category and the predetermined number of times may be set by a user or a manufacturer. In another embodiment, if it is identified that the boosting mode of the processor 120 is required when the applications 10 are executed based on the information included in the applications 10, the processor 120 may determine the boosting mode as the control mode of the processor 120. Here, the information included in the applications 10 may be information generated by a distributor, a producer, etc. of the applications 10.

For instance, if the application 10 corresponding to a user's execution command is 'Message Application A' that belongs to a Social Network Service (SNS) category which is urgently requested (or set by the user), the processor 120 may determine the boosting mode as the control mode of the processor 120 when executing 'Message Application A'. In addition, the processor 120 may control to operate the processor 120 at Level. 3 of the boosting level information 20 corresponding to 'Message Application A'.

In another embodiment, if the application 10 corresponding to a user's execution command is 'Shopping Mall A' that belongs to a Life Style category that is not set by the user, the processor 120 may determine the general mode as the control mode of the processor 120 when executing 'Shopping Mall A'.

Referring back to FIG. 1, the processor 120 according to an embodiment may determine the control mode of the processor 120 based on state information 80 of the electronic apparatus 100, and if the boosting mode is determined as the control mode of the processor 120, may execute the application 10 based on the boosting level information 20 stored in the memory 110, which will be described in detail with reference to FIG. 8.

Figure 8:
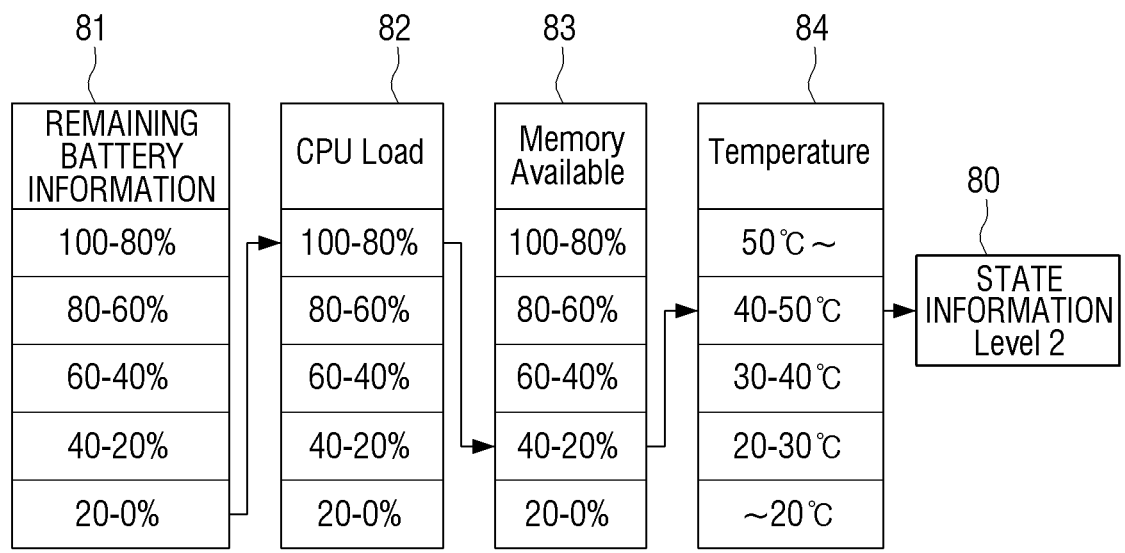
FIG. 8 is a view provided to explain state information according to an embodiment.

FIG. 8 is a view provided to explain state information according to an embodiment.

The processor 120 according to an embodiment, if a user command to execute the applications 10 is input, may determine the control mode of the processor 120 based on the state information 80 before controlling the operating frequency of the processor 120 to correspond to the boosting level mode 20 of the applications 10. For instance, the processor 120 may execute the applications 10 while maintaining the operating frequency of the processor 120 at the fundamental frequency according to the state information 80 and in another embodiment, the processor 120 may execute the applications 10 by changing the operating frequency of the processor 120 to correspond to the boosting level mode 20.

The state information 80 of the electronic apparatus 100 according to an embodiment may include at least one of remaining battery information 81 of the electronic apparatus 100, usage information 82 of the processor 120, usage information 83 of the memory 110, or heat emitting information 84 of the electronic apparatus 100.

Here, the remaining battery information 81 may mean a ratio of the remaining battery capacity to the total battery capacity. According to an embodiment, in order to increase the operating frequency of the processor 120, the voltage supplied to the processor 120 should be increased and thus, the electronic apparatus 100 may determine a control mode based on the remaining battery information 81. For instance, if the remaining battery capacity is less than 20% based on the remaining battery information 81, the boosting mode may not be executed. However, this is only an example, and the present disclosure is not limited thereto. For instance, if the remaining battery capacity is less than 20%, the processor 120 may control the operating frequency of the processor 120 by executing the boosting mode only for the applications which belong to a specific category.

The usage information 82 of the processor 120 may mean a CPU ratio in the form of a percentage (%). The electronic apparatus 100 according to an embodiment may include a monitoring module real-time usage and obtain a CPU ratio using the monitoring module. However, this is only an example, and the processor 120 may monitor a usage ratio by itself.

The usage information 83 of the memory 110 according to an embodiment may mean a ratio of the available capacity to the total capacity of the memory 110 provided in the electronic apparatus 100. For instance, if there are a large number of applications running (or being executed) in a multi-tasking environment, the ratio of the available capacity may be reduced. The processor 120 according to an embodiment, if the available capacity is less than 20% based on the usage information 83 of the memory 110, may not execute the boosting mode. However, this is only an example, and the present disclosure is not limited thereto. For instance, if the available capacity is less than 20%, the processor 120 may control the operating frequency of the processor 120 by executing the boosting mode only for the applications which belong to a specific category.

The processor 120 according to an embodiment may determine whether to enter the boosting mode based on the heat emitting information 84 of the electronic apparatus 100. For instance, in the boosting mode, the temperature of the electronic apparatus 100 may increase as the operating frequency of the memory 110, etc. increases. When the temperature exceeds a certain level, the components of the electronic apparatus 100 may be damaged and thus, the processor 120 may not execute the boosting mode when the temperature of the electronic apparatus 100 exceeds a threshold temperature based on the heat emitting information 84. However, this is only an example, and the present disclosure is not limited thereto. For instance, if the temperature of the electronic apparatus 100 is equal to or greater than 50° C. based on the heat emitting information 84, the processor 120 may control the operating frequency of the processor 120 by executing the boosting mode only for the applications which belong to a specific category.

The processor 120 according to an embodiment may obtain the state information 80 of the electronic apparatus 100 by combining the remaining battery information 81, the usage information 82 of the processor 120, the usage information 83 of the memory 110, and the heat emitting information 84 of the electronic apparatus 100, and adjust the boosting level information 20 based on the obtained state information 80.

For instance, the processor 120 may assign 1 point to 0-20%, 2 points to 20-40%, 3 points to 40-60%, 4 points to 60-80%, and 5 points to 80-100% based on the remaining battery information 81. Subsequently, the processor 120 may assign 5 points to 0-20%, 4 points to 20-40%, 3 points to 40-60%, 2 points to 60-80%, an 1 point to 80-100% based on the usage information 82 of the processor 120. Subsequently, the processor 120 may assign 5 points to 0-20%, 4 points to 20-40%, 3 points to 40-60%, 2 points to 60-80%, and 1 point to 80-100% based on the usage information 83 of the memory 110. In addition, the processor 120 may assign 1 point to 50° C. or higher, 2 points to 40-50° C., 3 points to 30-40° C., 4 points to 20-30%, and 5 points to 20% or lower based on the heat emitting information 84.

The processor 120 according to an embodiment may sum up the scores given through each information, and obtain Level 5 as the state information 80 if the score is 17-20 points, Level 4 as the state information 80 if the score is 13-16 points, Level 3 as the state information 80 if the score is 9-12 points, Level 2 as the state information 80 if the score is 5-8 points, and Level 1 as the state information 80 if the score is 1-4 points. Subsequently, if the level according to the state information 80 is equal to or higher than a predetermined level, the processor 120 may execute the boosting mode. Here, each numerical value is not limited to one embodiment. It is needless to say that the scores obtainable from each information may be further subdivided, the specific information may not be considered, and other information may be additionally considered.

The processor 120 according to an embodiment may control the operating frequency of the processor 120 based on one of the state information 80, the boosting level information 20 or the updated boosting level information 20'. For instance, if the level according to the state information 80 is equal to or greater than a predetermined level, the processor 120 may control the operating frequency of the processor 120 based on the updated boosting level information 20'.

Figure 2:
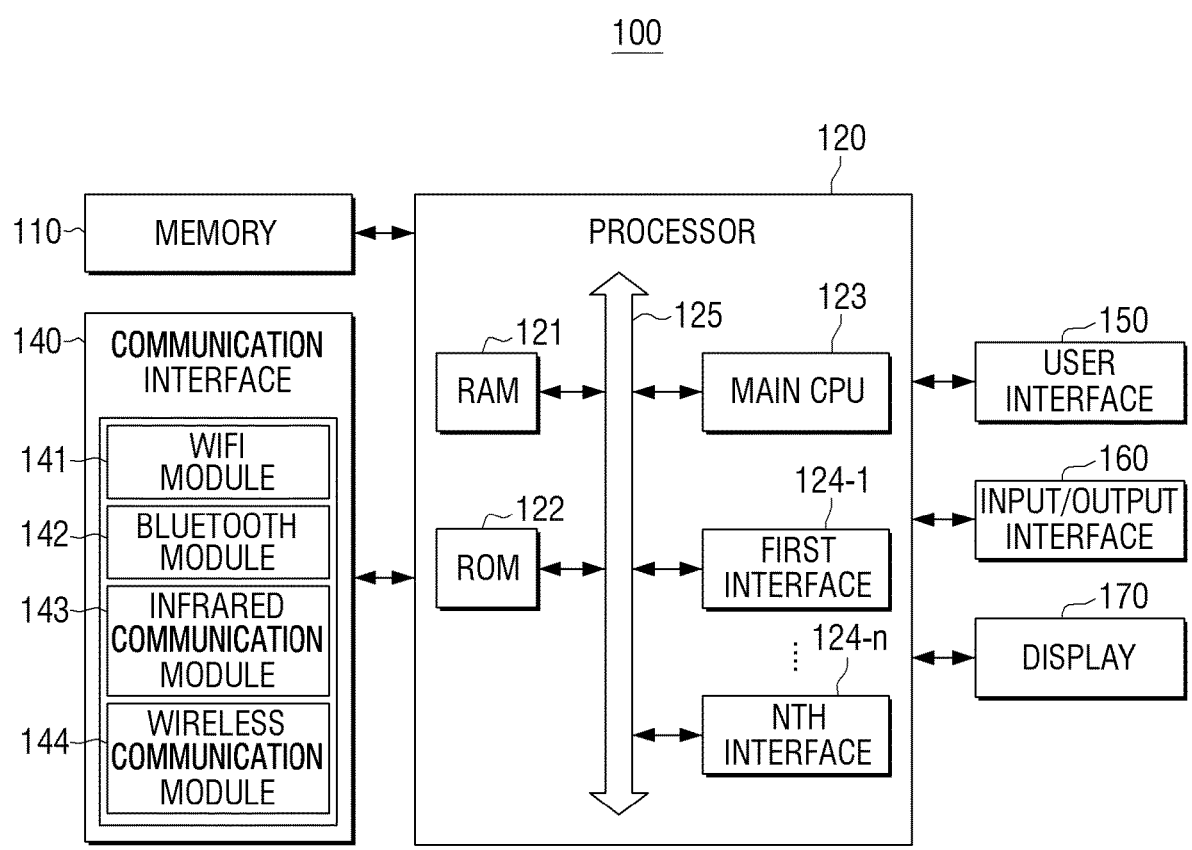
FIG. 2 is a block diagram illustrating detailed configuration of an electronic apparatus according to an embodiment.

FIG. 2 is a block diagram illustrating detailed configuration of an electronic apparatus according to an embodiment.

Referring to FIG. 2, the electronic apparatus 100 includes the memory 110, the processor 120, communication interface 140, user interface 150, input/output interface 160, and a display 170. The detailed description of the components of FIG. 2 which are overlapped with those in FIG. 1 will not be provided.

The memory 110 may be implemented as an internal memory such as a ROM (e.g., an electrically erasable programmable read-only memory (EEPROM)), a RAM or the like, included in the processor 120, or be implemented as a memory separate from the processor 120. In this case, the memory 110 may be implemented in the form of a memory embedded in the electronic apparatus 100, or in the form of a memory detachable from the electronic apparatus 100 depending on the purpose of data storage. For instance, in the case of data for driving the electronic apparatus 100, the data may be stored in a memory embedded in the electronic apparatus 100, and in the case of data for the extended function of the electronic apparatus 100, the data may be stored in a memory which can be detached from the electronic apparatus 100. Meanwhile, when a memory is embedded in the electronic apparatus 100, the memory may be implemented as at least one of a volatile memory (e.g., dynamic RAM (DRAM), static RAM (SRAM), or synchronous dynamic RAM (SDRAM)), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), a hard disk drive (HDD) or a solid state drive (SSD). When a memory is removably attached to the electronic apparatus 100, the memory may be implemented as a memory card (e.g., a compact flash (CF)), a secure digital (SD), a micro secure digital (Micro-SD), a mini secure digital (Mini-SD), an extreme digital (xD), a multi-media card (MMC)), an external memory connectable to a universal serial bus (USB) port (e.g., USB memory) or the like.

The processor 120 controls the overall operations of the electronic apparatus 100 using various programs stored in the memory 110.

Specifically, the processor 120 includes a random access memory (RAM) 131, a read only memory (ROM) 132, a main central processing unit (CPU) 133, first through nth interfaces 134-1 through 134-n, and a bus 135.

The RAM 131, the ROM 132, the main CPU 133, the first through nth interfaces 134-1 through 134-n, etc. may be connected to one another through the bus 135.

The ROM 132 stores a set of commands for system booting. If a turn-on command is input and the power is supplied, the CPU 133 copies the O/S stored in the memory 110 into the RAM 131 according to the command stored in the ROM 132, and boots the system by executing the O/S. In response to the booting being completed, the main CPU 133 may copy various application programs stored in the memory 110 to the RAM 131, and execute the application programs copied to the RAM 131 to perform various operations.

The main CPU 133 accesses the memory 110 to perform booting using the OS stored in the memory 110. The main CPU 133 performs various operations by using the various programs, contents, data, and the like stored in the memory 110.

The first to the nth interfaces 134-1 to 134-n are connected to the above-described various components. One of the interfaces may be a network interface which is connected to an external device via network.

Meanwhile, the processor 120 may perform a graphic processing function (a video processing function). For instance, the processor 120 may generate a screen including various objects such as an icon, an image, a text, etc. using a calculator (not shown) and a renderer (not shown). Here, the operator (not illustrated) may operate attribute values, such as coordinate values at which each object will be represented, forms, sizes, and colors according to a layout of the screen, based on the received control command. The renderer (not illustrated) may generate a screen of various layouts including the objects based on the attribute values which are operated by the operator (not illustrated). The processor 120 may perform various image processing such as decoding, scaling, noise filtering, frame rate conversion, resolution conversion, etc. on video data.

Meanwhile, the processor 120 may perform processing on audio data. Specifically, the processor 120 may perform various processing such as decoding, amplification, and noise filtering, etc. on audio data.

The communication interface 140 is provided to perform communication with various types of external devices according to various types of communication methods. The communication interface 140 includes a WiFi module 141, a Bluetooth module 142, an infrared communication module 143, a wireless communication module 144, etc. Here, each communication module may be implemented in the form of at least one hardware chip.

The processor 120 may perform communication cation with various external devices using the communication interface 140. Here, the external devices may include a display apparatus such as a TV, an image processing apparatus such as a set-top box, an external server, a control apparatus such as a remote controller, an audio output apparatus such as a Bluetooth speaker, a lighting apparatus, a home appliance such as a smart cleaner or a smart refrigerator, a server such as an internet of things (TOT) home manager or the like.

The WiFi module 141 and the Bluetooth module 142 may perform communication in a WiFi manner and a bluetooth manner, respectively. When using the WiFi module 141 or the bluetooth module 142, various kinds of connection information such as a service set identifier (SSID), a session key and the like, are first transmitted and received, communication is established using the connection information, and various kinds of information may then be transmitted and received.

The infrared communication module 143 performs communication based on an infrared data association (IrDA) technology for transmitting data wirelessly at a short distance using an infrared ray between a time ray and a millimeter wave.

In addition to the above-described communication methods, the wireless communication module 144 may include at least one communication chip which performs communication according to various wireless communication standards such as such as a zigbee, a 3rd generation (3G) evolution, a 3rd generation partnership project (3GPP), a long term evolution (LTE), LTE Advanced (LTE-A), a 4th Generation (4G) evolution, a 5th generation (5G) evolution, etc.

In addition, the communication interface 140 may include at least one of a local area network (LAN) module, an Ethernet module or a wired communication module that performs communication using a pair cable, a coaxial cable, an optical fiber cable or the like.

According to an embodiment, the communication interface 140 may use the same communication module (e.g., a WiFi module) to communicate with an external apparatus such as a remote controller and an external server.

According to another embodiment, the communication interface 140 may use a different communication module (e.g., a WiFi module) to communicate with an external apparatus such as a remote controller and an external server. For example, the communication interface 140 may use at least one of an Ethernet module or a WiFi module to communicate with an external server, and may use a Bluetooth (BT) module to communicate with an external apparatus such as a remote controller. However, this is only an example, and the communication interface 140 may use at least one communication module among various communication modules when communicating with a plurality of external apparatuses or external servers.

The user interface 140 may be implemented as an apparatus such as a button, a touch pad, a mouse or a keyboard, or a touch screen capable of performing the above-described display function and operation input function. Here, the button may be one of various types of buttons such as a mechanical button, a touch pad, a wheel and the like, which are formed in any region such as a front surface portion, a side surface portion, a rear surface portion and the like of a body appearance of the electronic apparatus 100.

The input/output interface 160 may be an interface of any of a high definition multimedia interface (HDMI), a mobile high-definition link (MHL), a universal serial bus (USB), a display port (DP), a thunderbolt, a video graphics array (VGA) port, a red-green-blue (RGB) port, a d-subminiature (D-SUB) or a digital visual interface (DVI).

The input/output interface 160 may input or output at least one of audio signals or video signals.

According to an embodiment, the input/output interface 160 may include a port for inputting/outputting only audio signals and a port for inputting/outputting only video signals as separate ports, or a single port for inputting/outputting both audio signals and video signals.

The electronic apparatus 100 may be implemented as an apparatus that does not include a display, and may transmit an image signal to a separate display apparatus.

Meanwhile, the electronic apparatus 100 may receive a user voice signal from an external apparatus including a microphone. In this case, the received user voice signal may be a digital voice signal, but may be an analog voice signal depending on embodiments. For instance, the electronic apparatus 100 may receive a user voice signal through wireless communication method such as Bluetooth, WiFi and the like. Here, the external apparatus may be implemented as a remote controller or a smart phone.

In order to perform voice recognition of the voice signal received from an external apparatus, the electronic apparatus 100 may transmit the corresponding voice signal to an external server.

In this case, the communication module for communication with the external apparatus and the external server may be implemented as one module or separate modules. For instance, a Bluetooth module may be used for communication with the external apparatus, and an Ethernet modem or a WiFi module may be used for communication with the external server.

The display 170 may provide various content screens which can be provided through the electronic apparatus 100. Here, the content screens may include various contents such as image, video, text, music, etc., application execution screens including various contents, Graphic User Interface (GUI) screens, etc.

The display 170 may be implemented in various forms such as liquid crystal display (LCD), organic light-emitting diode (OLED), liquid crystal on silicon (LCoS), digital light processing (DLP), Micro LED, quantum dot (QD) display panel, etc., but is not limited thereto. In addition, the display may be implemented as a flexible display, a transparent display, etc.

In addition, the display 170 according to an embodiment may include not only a display panel that outputs an image but also a bezel that houses the display panel. In particular, the bezel according to an embodiment may include a touch sensor (not illustrated) to sense a user interaction.

Particularly, the display 170 may display at least one of a plurality of interior images, an image captured through the camera or an image obtained by the processor 120 as described later.

Meanwhile, the display 170 provided on the electronic apparatus 100 may display various screens generated by a graphic processor. The electronic apparatus 100 may include the display 170 as a component, but may transmit a signal corresponding to a screen to an external apparatus which is connected through an interface (not illustrated) and display various screens through a display of the external apparatus.

Meanwhile, the electronic apparatus 100 may further include a tuner and a demodulator according to an embodiment.

The tuner (not illustrated) may receive a Radio Frequency (RF) broadcast channel by tuning a channel selected by a user or all pre-stored channels among RF broadcast signals received through an antenna.

The demodulator (not illustrated) may receive and demodulate the digital IF signal (DIF) converted by the tuner, and perform channel decoding, etc.

Figure 9:
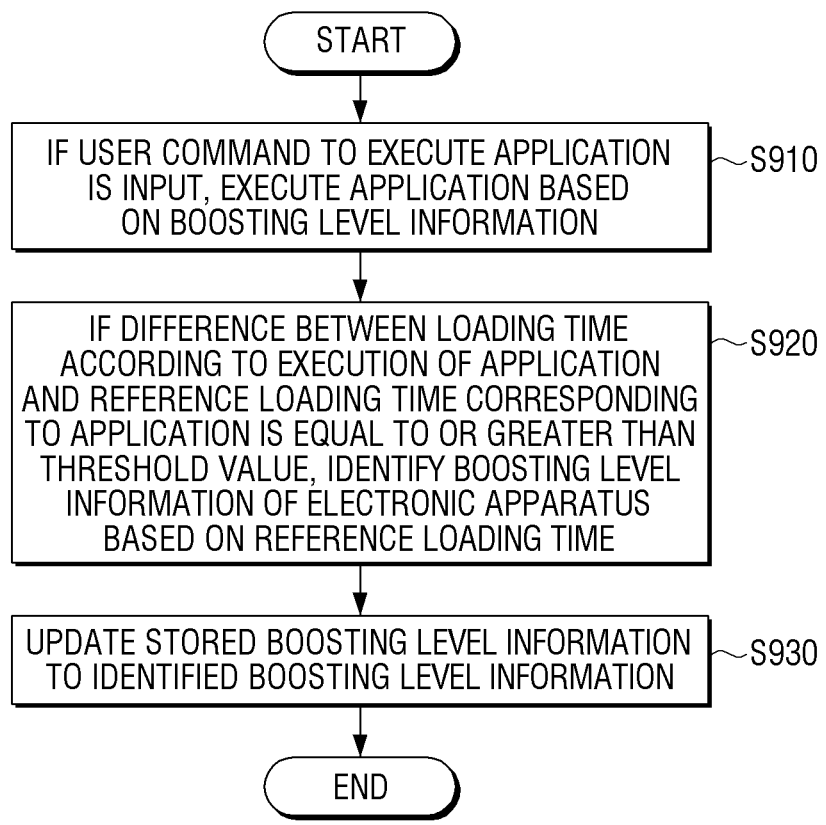
FIG. 9 is a flowchart provided to explain a controlling method of an electronic apparatus according to an embodiment.

FIG. 9 is a flowchart provided to explain a controlling method of an electronic apparatus according to an embodiment.

The controlling method of an electronic apparatus storing boosting level information of the electronic apparatus for each application according to an embodiment may include, if a user command to execute an application is input, executing the application based on the boosting level information (S910). Subsequently, if the difference between the loading time according to the execution of the application and the reference loading time corresponding to the application is equal to or greater than a threshold value, the boosting level information of the electronic apparatus is identified based on the reference loading time (S920). The stored boosting level information is updated to the identified boosting level information (S930).

Here, the operation (S920) of identifying the boosting level information may include identifying the boosting level information corresponding to the reference loading time based on the loading time of the application for each boosting level information.

The operation (S920) of identifying the boosting level information according to an embodiment may include identifying the boosting level information to reduce the loading time of the application by a difference value based on the difference value between the loading time according to the execution of the application and the reference loading time.

The boosting level information of the electronic apparatus for each application according to an embodiment may be determined based on an execution history of each application.

The controlling method according to an embodiment includes, if a user command to re-execute an application is input, controlling the operating frequency of the processor based on one of the boosting level information and the updated boosting level information in consideration of the state information of the electronic apparatus.

Here, the state information of the electronic apparatus may include at least one of the remaining battery information of the electronic apparatus, the usage information of the processor, the usage information of the memory, or the heat emitting information of the electronic apparatus.

The operation of determining the control mode of the processor based on the state information of the electronic apparatus according to an embodiment may include, if the boosting mode is determined as the control mode of the processor, executing an application based on the boosting level information.

The controlling method according to an embodiment may include determining the control mode of the processor based on the type information of the application and the execution frequency information of the application, and if the boosting mode is determined as the control mode, executing the application based on the boosting level information.

Here, the boosting level information of the electronic apparatus may be information which is divided based on the operating frequency information of the processor.

In addition, the reference loading time may include at least one of a recommended loading time of the application, a loading time when the application is initially executed, an average loading time of the application or a loading time when the application is executed in a state where the electronic apparatus is in an idle state.

Meanwhile, the methods according to the above-described various embodiments may be implemented in the form of an application which can be installed in the existing electronic apparatus.

In addition, the methods according to the above-described various embodiments may be implemented only through software upgrade or hardware upgrade regarding the existing electronic apparatus.

In addition, the above-described various embodiments may be performed through at least one external server among a server imbedded in the electronic apparatus, the electronic apparatus or the display device.

Meanwhile, the various example embodiments described above may be implemented as an S/W program including an instruction stored on machine-readable (e.g., computer-readable) storage media. The machine is an apparatus which is capable of calling a stored instruction from the storage medium and operating according to the called instruction, and may include an electronic apparatus (e.g., an electronic apparatus A) according to the above-described example embodiments. When the instruction is executed by a processor, the processor may perform a function corresponding to the instruction directly or using other components under the control of the processor. The command may include a code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an example embodiment, the method according to the various example embodiments described above may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™). In the case of online distribution, at least a portion of the computer program product may be at least temporarily stored or temporarily generated in a server of the manufacturer, a server of the application store, or a storage medium such as memory.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program, or other component, according to various exemplary embodiments, may be sequential, parallel, or both, executed iteratively or heuristically, or at least some operations may be performed in a different order, omitted, or other operations may be added.

The foregoing example embodiments and advantages are merely exemplary and are not to be construed as limiting the present disclosure. The present teaching may be readily applied to other types of devices. Also, the description of the example embodiments of the present disclosure is intended to be illustrative, and not to limit the scope of the claims, and many alternatives, modifications, and variations will be apparent to those skilled in the art.

What is claimed is:

1. An electronic apparatus comprising:
   a memory configured to store boosting level information of the electronic apparatus for applications executable on the electronic apparatus; and
   a processor configured to:
      based on receipt of a command to execute an application among the applications, execute the application based on a first boosting level among a plurality of boosting levels included in the boosting level information,
      based on a difference between a loading time according to execution of the application and a reference loading time being equal to or greater than a threshold value, identify a second boosting level among the plurality of boosting levels based on a loading time, corresponding to a boosting level of the plurality of boosting levels, and the reference loading time, and
      update the stored boosting level information based on the second boosting level, and
   wherein the second boosting level makes the difference between the loading time according to execution of the application and the reference loading time less than the threshold value.

2. The apparatus as claimed in claim 1, wherein the boosting level information of the electronic apparatus for each application stored in the memory is identified based on an execution history of the each application.

3. The apparatus as claimed in claim 1, wherein the processor, based on a re-execution command to re-execute the application being input, controls an operation frequency of the processor based on one of the first boosting level or the second boosting level according to state information of the electronic apparatus.

4. The apparatus as claimed in claim 3, wherein the state information of the electronic apparatus includes at least one of information regarding a remaining battery of the electronic apparatus, usage information of the processor, usage information of the memory, or heat-emitting information.

5. The apparatus as claimed in claim 1, wherein the processor identifies a control mode of the processor based on state information of the electronic apparatus, and
   based on the control mode of the processor identified being a boosting mode, executes the application based on the boosting level information stored in the memory.

6. The apparatus as claimed in claim 1, wherein the processor identifies a control mode of the processor based on type information of the application and execution frequency information of the application, and based on the control mode of the processor identified being a boosting mode, executes the application based on the boosting level information stored in the memory.

7. The apparatus as claimed in claim 1, wherein the each of the plurality of boosting levels of the electronic apparatus is assigned based on operation frequency information of the processor.

8. The apparatus as claimed in claim 1, wherein the reference loading time includes at least one of a recommended loading time of the application, a loading time when the application is initially executed, an average loading time of the application or a loading time when the application is executed in a state where the electronic apparatus is in an idle state.

9. A controlling method of an electronic apparatus, the method comprising:
   storing boosting level information of the electronic apparatus for applications executable on the electronic apparatus;
   based on receipt of a command to execute an application among the applications, executing the application based on a first boosting level among a plurality of boosting levels included in the boosting level information;
   based on a difference between a loading time according to execution of the application and a reference loading time being equal to or greater than a threshold value, identifying a second boosting level among the plurality of boosting levels based on a loading time, corresponding to a boosting level of the plurality of boosting levels, and the reference loading time; and updating the stored boosting level information based on the second to the identified other boosting level information, and wherein the second boosting level makes the difference between the loading time according to execution of the application and the reference loading time less than the threshold value.

10. The method as claimed in claim 9, wherein the boosting level information of the electronic apparatus for each application is identified based on an execution history of the each application.

11. The method as claimed in claim 9, comprising:

based on a re-execution command to re-execute the application being input, controlling an operation frequency of the processor based on one of the first boosting level or the second according to state information of the electronic apparatus.

12. The method as claimed in claim 11, wherein the state information of the electronic apparatus includes at least one of information regarding a remaining battery of the electronic apparatus, usage information of the processor, usage information of the memory, or heat-emitting information.

13. The method as claimed in claim 9, comprising:

identifying the control mode of the processor based on state information of the electronic apparatus; and based on the control mode of the processor identified being a boosting mode, executing the application based on the boosting level information stored.

14. The method as claimed in claim 9, comprising:

identifying the control mode of the processor based on type information of the application and execution frequency information of the application; and based on identifying that the control mode of the processor is a boosting mode, executing the application based on the boosting level information.

15. The method as claimed in claim 9, wherein the each of the plurality of boosting level of the electronic apparatus is assigned based on operation frequency information of the processor.

16. The method as claimed in claim 9, wherein the reference loading time includes at least one of a recommended loading time of the application, a loading time when the application is initially executed, an average loading time of the application or a loading time when the application is executed in a state where the electronic apparatus is in an idle state.

\* \* \* \* \*